(12) United States Patent
Lee et al.

(10) Patent No.: US 10,302,987 B2
(45) Date of Patent: May 28, 2019

(54) DISPLAY DEVICE

(71) Applicant: Samsung Display Co., Ltd., Yongin-si, Gyeonggi-do (KR)

(72) Inventors: Baek Hee Lee, Yongin-si (KR); Yong Seok Kim, Seoul (KR); Min Ki Nam, Anseong-si (KR); Hae Il Park, Seoul (KR)

(73) Assignee: Samsung Display Co., Ltd. (KR)

( * ) Notice: Subject to any disclaimer, the term of this patent is extended or adjusted under 35 U.S.C. 154(b) by 28 days.

(21) Appl. No.: 15/594,026

(22) Filed: May 12, 2017

(65) Prior Publication Data

US 2017/0329175 A1 Nov. 16, 2017

(30) Foreign Application Priority Data

May 13, 2016 (KR) .................. 10-2016-0058943

(51) Int. Cl.
*G02F 1/1335* (2006.01)
*G02F 1/1333* (2006.01)

(52) U.S. Cl.
CPC .. *G02F 1/133504* (2013.01); *G02F 1/133345* (2013.01); *G02F 1/133512* (2013.01); *G02F 1/133514* (2013.01); *G02F 1/133528* (2013.01); *G02F 1/133621* (2013.01); *G02F 1/133377* (2013.01); *G02F 2001/133562* (2013.01);
(Continued)

(58) Field of Classification Search
CPC ......... G02F 1/133555; G02F 1/133528; G02F 1/13363; G02F 1/1343; G02F 1/133603; G02F 1/133604; G02F 1/13454; G02F 1/136227; G02F 2001/133531; G02F 1/133514; G02F 1/133621; G02F 1/133602; G09G 3/3648; G02B 5/0242; G02B 6/0056

See application file for complete search history.

(56) References Cited

U.S. PATENT DOCUMENTS

| 8,654,290 B2 * | 2/2014 | Mizusaki ............ G02B 5/3083 349/127 |
| 2004/0085496 A1 * | 5/2004 | Paukshto .......... G02F 1/133528 349/106 |

(Continued)

FOREIGN PATENT DOCUMENTS

| KR | 10-2010-0053409 A | 5/2010 |
| KR | 10-2014-0074495 A | 6/2014 |

(Continued)

*Primary Examiner* — Huyen L Ngo
(74) *Attorney, Agent, or Firm* — Innovation Counsel LLP

(57) ABSTRACT

A display device may include a first polarizer, a second polarizer, a liquid crystal layer, a light unit, a color filter layer, and a particle set. The second polarizer may overlap the first polarizer. The liquid crystal layer may be positioned between the first polarizer and the second polarizer. The light unit may overlap the liquid crystal layer and may provide first light. The first polarizer may be positioned between the light unit and the liquid crystal layer. The color filter layer may overlap the liquid crystal layer. The second polarizer may be positioned between the color filter layer and the liquid crystal layer. The particle set may include a plurality of particles, may overlap the liquid crystal layer, and may scatter the first light. The second polarizer may be positioned between the particle set and the liquid crystal layer.

20 Claims, 12 Drawing Sheets

(52) U.S. Cl.
  CPC ............ *G02F 2001/133614* (2013.01); *G02F 2202/36* (2013.01)

(56) References Cited

U.S. PATENT DOCUMENTS

2004/0201795 A1* 10/2004 Paukshto ............ G02B 5/3016
                                                              349/96
2012/0113672 A1    5/2012 Dubrow et al.

FOREIGN PATENT DOCUMENTS

| KR | 10-2014-0105175 A | 9/2014 |
| KR | 10-2015-0071317 A | 6/2015 |
| KR | 10-2015-0074886 A | 7/2015 |

* cited by examiner

DISPLAY DEVICE

CROSS-REFERENCE TO RELATED APPLICATION

This application claims priority to and the benefit of Korean Patent Application No. 10-2016-0058943 filed in the Korean Intellectual Property Office on May 13, 2016; the entire contents of the Korean Patent Application are incorporated herein by reference.

BACKGROUND

(a) Technical Field

The technical field relates to a display device.

(b) Description of the Related Art

Display devices may be included in various electronic devices such as televisions, computer monitors, smartphones, tablets, laptops, etc., which may be viewed at various angles. At some of the angles, colors and/or luminance of images displayed by a display device and viewed from angles may not be sufficiently consistent.

The above information disclosed in this Background section is for enhancement of understanding of the background of this application. This Background section may contain information that does not form the prior art that is already known in this country to a person of ordinary skill in the art.

SUMMARY

An embodiment may be related to a display device that includes the following elements: a display panel including a first polarizer and a second polarizer facing each other and including a liquid crystal layer positioned between the first polarizer and the second polarizer; a backlight unit positioned at a first surface of the display panel for providing first light to the display panel; a color filter layer positioned at a second surface of the display panel facing the first surface of the display panel; and a scattering layer positioned between the display panel and the color filter layer for scattering the first light.

The color filter layer may convert the first light scattered by the scattering layer into second light having a different wavelength from that of the first light.

In the scattering layer, a plurality of the scatterers may be dispersed and disposed in a resin composition.

A diameter of each of the scatterers may be in a range of about 0.1 times a wavelength of the first light to 0.5 times the wavelength of the first light.

The scatterers may have two or more refractive indexes.

At least one of the first polarizer and the second polarizer may be a wire grid polarizer.

The backlight unit may include a light source for emitting blue light and may include a color conversion sheet with a red color conversion quantum dot and a green color conversion quantum dot, wherein the blue light emitted from the light source may pass through the color conversion sheet to be converted into white light.

The scattering layer may have a thickness in a range of about 1 μm to about 10 μm.

An embodiment may be related to a display device that includes the following elements: a display panel including a first polarizer and a second polarizer facing each other and including a liquid crystal layer positioned between the first polarizer and the second polarizer; a backlight unit positioned at a first surface of the display panel for providing first light to the display panel; and a color filter layer positioned at a second surface of the display panel facing the first surface of the display panel, wherein the color filter layer includes a plurality of scatterers for scattering the first light.

The color filter layer may include a resin composition, and the plurality of the scatterers may be dispersed and disposed in the resin composition.

A diameter of each of the scatterers may be in a range of about 0.1 times a wavelength of the first light to 0.5 times the wavelength of the first light.

The scatterers may have two or more refractive indexes.

At least one of the first polarizer and the second polarizer may be a wire grid polarizer.

The backlight unit may include a light source for emitting blue light and may include a color conversion sheet with a red color conversion quantum dot and a green color conversion quantum dot, wherein the blue light emitted from the light source may pass through the color conversion sheet to be converted into white light.

At least one of red, green, and blue color filters of the color filter layer may include the scatterers and may have a thickness in a range of about 1 μm to about 10 μm.

An embodiment may be related to a display device. The display device may include a first polarizer, a second polarizer, a liquid crystal layer, a light unit, a color filter layer, and a particle set. The second polarizer may overlap the first polarizer. The liquid crystal layer may be positioned between the first polarizer and the second polarizer. The light unit may overlap the liquid crystal layer and may provide first light. The first polarizer may be positioned between the light unit and the liquid crystal layer. The color filter layer may overlap the liquid crystal layer. The second polarizer may be positioned between the color filter layer and the liquid crystal layer. The particle set may include a plurality of particles, may overlap the liquid crystal layer, and may scatter the first light. The second polarizer may be positioned between the particle set and the liquid crystal layer.

The particle set may be positioned between the color filter layer and the second polarizer.

The display device may include an insulating resin layer positioned between the color filter layer and the second polarizer. The particles may be dispersed inside the insulating resin layer.

A diameter of each of the particles may be in a range of 0.1 times a wavelength of the first light to 0.5 times the wavelength of the first light.

The particle set may have two or more refractive indexes.

The display device may include a resin layer. The particles may be dispersed inside the resin layer. The second polarizer may directly contact the resin layer.

The light unit may include a light source for emitting blue light and a color conversion sheet. The color conversion sheet may overlap the light source and may include a red color conversion quantum dot and a green color conversion quantum dot.

The display device may include an insulating layer. The particles may be dispersed inside the insulating layer. A (minimum) thickness of the insulating layer may be in a range of 1 μm to 10 μm.

The particles may be dispersed inside the color filter layer. A (minimum) thickness of the color filter layer may be in a range of 1 μm to 10 μm.

The display device may include an insulating layer. The insulating layer may directly contact each of the color filter layer and the second polarizer. The particles may be dispersed inside the insulating layer. A first portion of the insulating layer may be positioned between the particle set and the second polarizer. A second portion of the insulating layer may be positioned between the particle set and the color filter layer.

The color filter layer may include a first-color filter and a second-color filter. At least one particle of the particles may be positioned inside a recess structure that is positioned between the first-color filter and the second-color filter.

The display device may include a light-blocking member. The light-blocking member may include a first light-blocking portion. The color filter layer may include a first-color filter and a second-color filter. The first light-blocking portion may be positioned between the first-color filter and the second-color filter and may form a recess structure with the first-color filter and the second-color filter. At least one particle of the particles may be positioned inside the recess structure.

The display device may include a transparent layer and a light-blocking member. The light-blocking member may directly contact the transparent layer and may include a first light-blocking portion and a second light-blocking portion. The color filter layer may include a first-color filter, a second-color filter, and a third-color filter. The first light-blocking portion may be positioned between the first-color filter and the second-color filter. The second light-blocking portion may be positioned between the second-color filter and the third-color filter. The transparent layer may form a recess structure with the first light-blocking portion and the second light-blocking portion. At least one particle of the particles may be positioned inside the recess structure. More than one of the particles may be positioned inside the recess structure.

The display device may include a transparent layer. The color filter layer may include a first-color filter. A portion of the first-color filter may be positioned between the transparent layer and one particle of the particles and may directly contact each of the transparent layer and the one particle of the particles.

The color filter layer may include a first-color filter and a second-color filter. The particle set may include a first particle subset and a second particle subset. A material of particles of the first particle subset may be identical to a material of particles of the second particle subset. The particles of the first particle subset may be dispersed inside the first-color filter. The particles of the second particle subset may be dispersed inside the second-color filter.

The display device may include a light-blocking member. The light-blocking member may include a light-blocking portion. The color filter layer may include a first-color filter and a second-color filter. The light-blocking portion may be positioned between the first-color filter and the second-color filter, may be positioned between two of the particles, and may be aligned with the two of the particles.

According to embodiments, since light passing through a first polarizer and a second polarizer of a display device is scattered by scatterers (or particles), light provided by the display device and viewed by one or more viewers may have substantially uniform luminance distribution at various viewing angles. According to embodiments, accurate red, green, and blue colors may be displayed with satisfactory color reproducibility. Advantageously, satisfactory image quality may be attained.

DETAILED DESCRIPTION OF EMBODIMENTS

Figure 1:
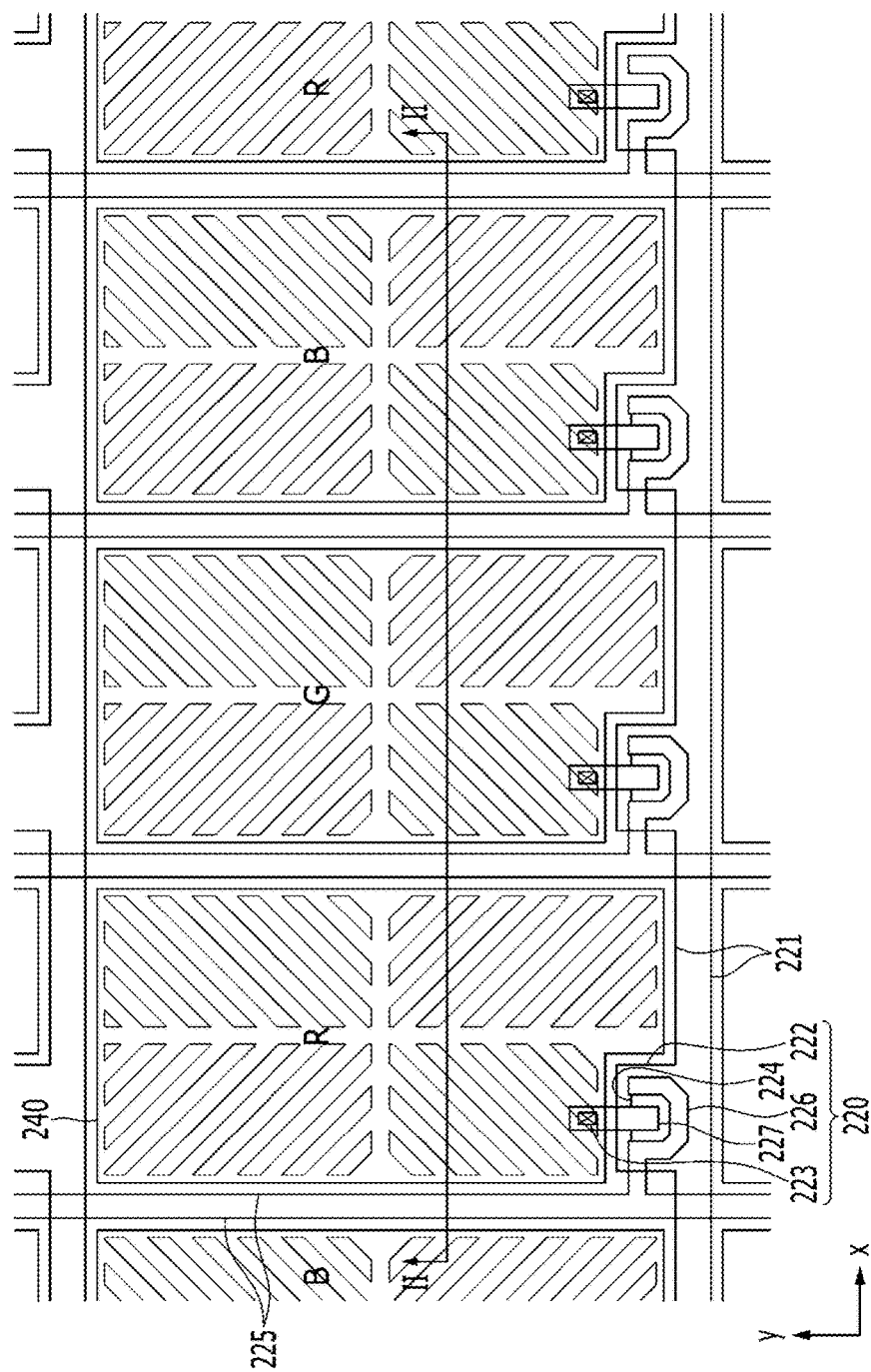
FIG. 1 illustrates a top plan view of a display device according to an embodiment.

Example embodiments are described with reference to the accompanying drawings. As those skilled in the art would realize, the described embodiments may be modified in various ways.

In this application, although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In this application, like reference numerals may designate like elements throughout the specification.

In the drawings, thicknesses of layers, films, panels, regions, etc. may be exaggerated for clarity.

If a first element (such as a layer, film, region, or substrate) is referred to as being "on" a second element, the first element can be directly on the second element, or one or more intervening elements may be present between the first element and the second element. If a first element is referred to as being "directly on" a second element, there are no intended intervening elements (except environmental elements such as air) present between the first element and the second element. In the specification, the word "on" or "above" means positioned on or below an object, and does not necessarily mean positioned on the upper side of the object based on a gravitational direction.

In this application, unless explicitly described to the contrary, the word "comprise" and variations such as "comprises" or "comprising" may mean inclusion of stated elements and may not imply exclusion of other elements.

In this application, the term "scatterer" may mean "particle".

Figure 2:
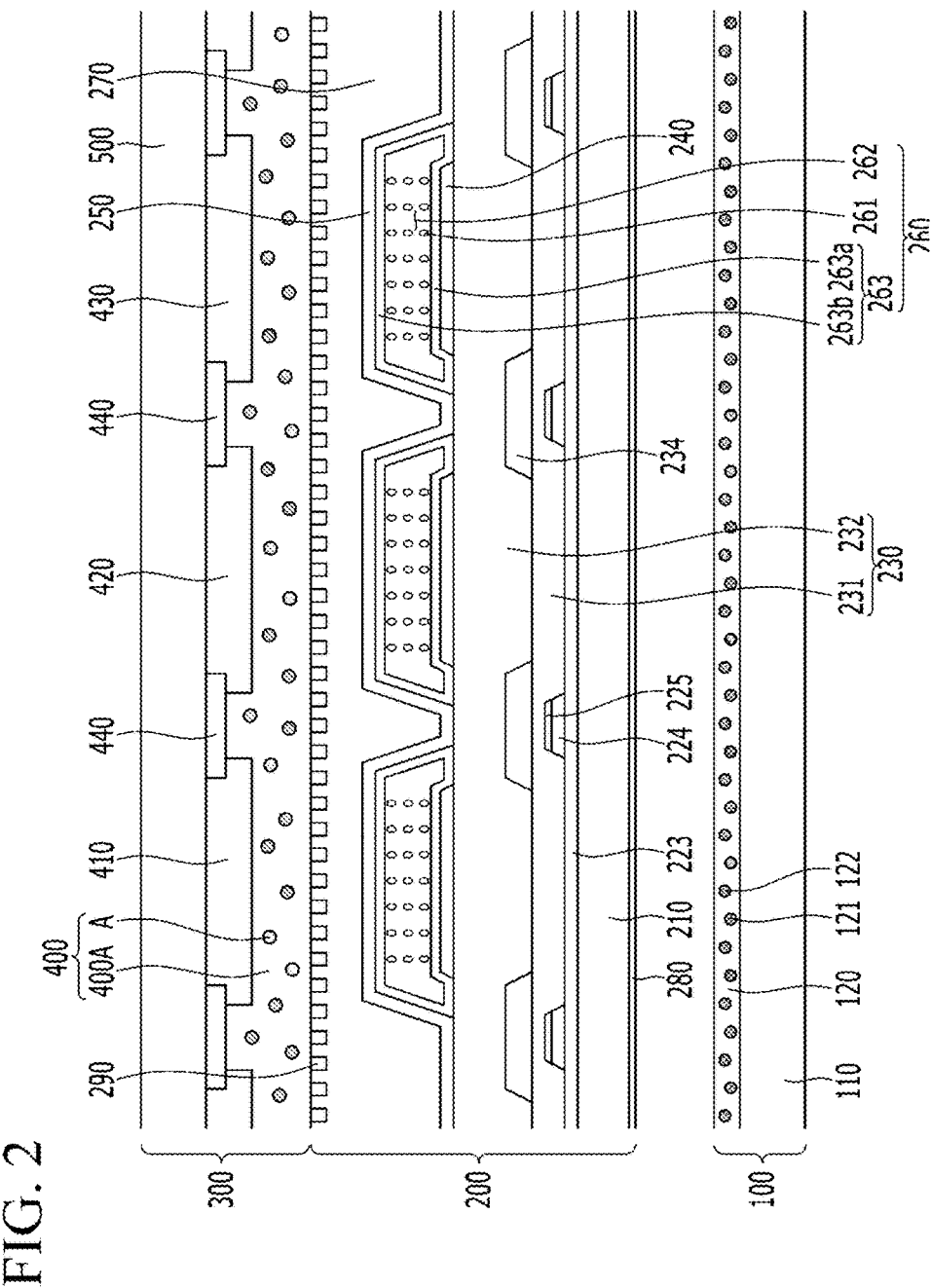
FIG. 2 illustrates a cross-sectional view of an embodiment taken along line II-II of FIG. 1.

FIG. 1 illustrates a top plan view of a display device according to an embodiment, and FIG. 2 illustrates a cross-sectional view of an embodiment taken along line II-II of FIG. 1.

The display device includes a backlight unit 100, a display panel 200, and a color conversion panel 300.

The backlight unit 100, which may provide first light to the display panel 200, includes a light source 110 that converts electrical energy into light energy and then emits it, and the light source 110 may be a blue light source 110 for emitting blue light. The backlight unit 100 may include a color conversion sheet 120 for converting blue light into white light.

The color conversion sheet 120 may include a red color conversion quantum dot 121 and a green color conversion quantum dot 122 for converting blue light into white light. When blue light is converted into white light by the color conversion sheet 120 including quantum dots and then passes through the display panel 200, color is changed by color filters 410, 420, and 430, such that differences of light intensity at different angles may be minimized. Accordingly, the effective viewing angle of the display device may be optimized.

In an embodiment, the backlight unit 100 may include a color combination for emitting white light.

In an embodiment, a quantum dot may be a core-shell structured quantum dot that includes a core including at least one of CdSe, CdS, CdTe, ZnS, ZnSe, ZnTe, CdSeTe, CdZnS, CdSeS, PbSe, PbS, PbTe, AgInZnS, HgS, HgSe, HgTe, GaN, GaP, GaAs, InP, InZnP, InGaP, InGaN, InAs, and ZnO and a shell including at least one of CdS, CdSe, CdTe, CdO, ZnS, ZnSe, ZnTe, ZnO, InP, InS, GaP, GaN, GaO, InZnP, InGaP, InGaN, InZnSCdSe, PbS, TiO, SrSe, and HgSe.

In an embodiment, although it is described that the red color conversion quantum dot 121 and the green color conversion quantum dot 122 are the quantum dots, they may include a material such as a quantum line and a quantum tetrapod for converting blue light into white light other than the quantum dot.

In an embodiment, an inorganic phosphor including garnets, silicates, sulfides, oxynitrides, nitrides, and aluminates may be used in the red color conversion quantum dot 121 and the green color conversion quantum dot 122. In an embodiment, the color conversion sheet 120 may include an inorganic phosphor including at least one of $Y_3Al_5O_{12}:Ce^{3+}$ (YAG:Ce), $Tb_3Al_5O_{12}:Ce^{3+}$ (TAG:Ce), $(Sr,Ba,Ca)_2SiO_4:Eu^{2+}$, $(Sr,Ba,Ca,Mg,Zn)_2Si(OD)_4:Eu^{2+}$ D=F,Cl,S,N,Br, $Ba_2MgSi_2O_7:Eu^{2+}$, $Ba_2SiO_4:Eu^{2+}$, $Ca_3(Sc,Mg)_2Si3O_{12}:Ce^{3+}$, $(Ca,Sr)S:Eu^{2+}$, $(Sr,Ca)Ga_2S_4:Eu^{2+}$, $SrSi_2O_2N_2:Eu^{2+}$, $SiAlON:Ce^{3+}$, $β-SiAlON:Eu^{2+}$, $Ca-α-SiAlON:Eu^{2+}$, $Ba_3Si_6O_{12}N_2:Eu^{2+}$, $CaAlSiN_3:Eu^{2+}$, $(Sr,Ca)AlSiN_3:Eu^{2+}$, $Sr_2Si_5N_8:Eu^{2+}$, $(Sr,Ba)Al_2O_4:Eu^{2+}$, $(Mg,Sr)Al_2O_4:Eu^{2+}$, and $BaMg_2Al_{16}O_{27}:Eu^{2+}$.

In an embodiment, the backlight unit 100 may include the light source 110 that generates white light and directly provides it to the display panel 200.

The display panel 200, which displays an image, includes a substrate 210, a thin film transistor 220 positioned on the substrate 210, a first electrode 240 (e.g., a first pixel electrode) connected to the thin film transistor, a second electrode 250 for generating an electric field with the first electrode 240, a roof layer 270 overlapping the first electrode 240 and covering the second electrode 250, and a liquid crystal layer 260 positioned at a plurality of microcavities 262 positioned between the first electrode 240 and the roof layer 270, for controlling light transmission in displaying the image.

A gate line 221 may extend in a row direction and may include a gate electrode 222. A gate insulating layer 223 may be positioned on the gate line 221. A semiconductor layer 224 may be positioned on the gate insulating layer 223. A data line 225 may extend in a column direction. A drain electrode 227 and a source electrode 226 (which is electrically connected to the data line 225) may be positioned on the semiconductor layer 224. A passivation layer 230 may be positioned on the data line 225 and the drain electrode 227 and including a first insulating layer 231 and a second insulating layer 232. The first electrode 240 may be physically and electrically connected to the drain electrode 227 through a contact hole 233. The above elements are positioned on the substrate 210. In an embodiment, a plurality of pixel electrodes that includes first electrodes 240 may form a matrix on the substrate 210.

The semiconductor layer 224 positioned on the gate electrode 222 forms a channel layer (not shown) in a region exposed by the source electrode 226 and the drain electrode 227. The gate electrode 222, the semiconductor layer 224, the source electrode 226, and the drain electrode 227 form one thin film transistor.

As described above, the passivation layer 230 includes the first insulating layer 231 and the second insulating layer 232. The first insulating layer 231 is provided on the thin film transistor to protect and electrically insulate the thin film transistor. The first insulating layer 231 may include an inorganic or organic insulation material such as at least one of a silicon nitride (SiNx), a silicon oxide (SiOx), and the like.

A light blocking member 234 may be provided on the first insulating layer 231. The light blocking member 234 may have a lattice structure with an opening corresponding to a region for displaying an image, and it is made of a material that does not transmit light.

The passivation layer 230 has the contact hole 233 exposing the drain electrode 227, and the drain electrode 227 and the first electrode 240 are electrically connected to each other through the contact hole 233.

The first electrode 240 is positioned on the second insulating layer 232. The first electrode 240 may be made of a transparent conductive material such as indium tin oxide (ITO), indium zinc oxide (IZO), or the like.

The first electrode 240 may have a substantially quadrangular planar shape, and may include a protrusion (not shown) protruding toward the thin film transistor. The protrusion is physically and electrically connected to the drain electrode 227 through the contact hole 233.

A lower alignment layer 263a is positioned on the first electrode 240, and an upper alignment layer 263b may overlap the lower alignment layer 263a. The lower alignment layer 263a and the upper alignment layer 263b may be vertical alignment layers.

In an embodiment, an alignment material for forming the alignment layer 263 and the liquid crystal layer 260 (including a plurality of liquid crystal molecules 261) may be injected into the microcavities 262 using capillary force. In an embodiment, the lower alignment layer 263a and the upper alignment layer 263b are distinguished from each other only by their positions, and as shown in FIG. 2, may be connected to each other. The lower alignment layer 263a and the upper alignment layer 263b may be simultaneously formed.

The microcavities 262 are positioned between the lower alignment layer 263a and the upper alignment layer 263b, and the liquid crystal molecules 261 injected into the microcavities 262 form the liquid crystal layer 260.

A plurality of the microcavities 262 may be arranged in a matrix form. The plurality of microcavities 262 may have liquid crystal inlets (not shown) overlapping the gate lines 221. The plurality of microcavities 262 adjacent in an x direction may be separated from each other by partition wall portions (not shown). Each of the microcavities 262 may correspond to one or more pixel areas, and the pixel areas may correspond to an area for displaying an image.

The second electrode 250 (e.g., a common electrode) and a second electrode passivation layer (not shown) are positioned on the upper alignment layer 263b. The second electrode 250 receives a common voltage, generates an electric field with the first electrode 240 (which may receive a data voltage), and determines a direction in which the liquid crystal molecules 261 are inclined. The second electrode passivation layer may be made of a silicon nitride (SiNx) or a silicon oxide (SiOx).

In an embodiment, the second electrode 250 is positioned on the microcavities 262. In some embodiments, the second electrode 250 may be positioned below the microcavities 262 such that the liquid crystals may be driven according to a coplanar electrode (CE) mode.

The roof layer 270 is positioned on the second electrode passivation layer. The roof layer 270 serves to support the first electrode 240 and the second electrode 250 so that the microcavities 262 corresponding to spaces between the first electrode 240 and the second electrode 250 may be formed.

Although not illustrated, a roof layer passivation layer may be positioned on the roof layer 270. The roof layer passivation layer may contact an upper surface of the roof layer 270, and may be unnecessary in some embodiments.

Although not illustrated, a cover layer may be positioned on the roof layer passivation layer. The cover layer includes an organic or inorganic material. In an embodiment, the cover layer may be positioned on the liquid crystal inlets in addition to the roof layer passivation layer. In an embodiment, the cover layer may cover the liquid crystal inlets of the microcavities 262 exposed by the liquid crystal inlets.

The display panel 200 includes a first polarizer 280 positioned at a first side of the display panel 200 and includes a second polarizer 290 positioned at a second side of the display panel 200 opposite the first side of the display panel 200.

First light emitted from the backlight unit 100 is firstly polarized by the first polarizer 280, and the first light of which intensity is adjusted while passing through the display panel 200 is again polarized by the second polarizer 290.

At least one of the first polarizer 280 and the second polarizer 290 may be a coated polarizer or a wire grid polarizer. The polarizers may be positioned at surfaces of the display panel 200 and may have one or more of various shapes such as a film shape, a coated shape, an attached shape, and the like.

FIG. 2 illustrates an embodiment in which the first polarizer 280 is a polarization film and the second polarizer 290 is a wire grid polarizer. The second polarizer 290 formed as the wire grid polarizer may be manufactured together with the display panel 200 in a manufacturing process of the display panel 200, and it may be positioned inside the display panel 200.

The display panel 200 may optimize a light emission ratio and color reproducibility, may provide excellent display quality, and may simplify a manufacturing process and a structure using a single substrate.

The color conversion panel 300 includes a scattering layer 400 including a plurality of scatterers (A), color filter layers 410, 420, and 430, and a window 500.

The scattering layer 400 may include an insulating layer 400A and the scatterers (A).

The insulating layer 400A is positioned at an upper surface of the second polarizer 290, and may flatten the surface. The insulating layer 400A may be made of a resin composition including an organic material, an inorganic material, or an organic and inorganic composite.

For example, the insulating layer 400A may be a transparent organic layer including an acryl-based resin, an inorganic layer including $SiO_x$ or $SiN_x$, or a layer including an organic and inorganic compound such as polysilsesquioxane.

In an embodiment, the insulating layer 400A may be made of a transparent organic layer material including a photo-curable polymer or a thermosetting polymer.

In an embodiment, the insulating layer 400A, including/surrounding the scatterers (A), may have a thickness (e.g., a minimum thickness in a direction perpendicular to the window 500) in a range of about 1 μm to about 10 μm. If the thickness of the insulating layer 400A is thinner than about 1 μm, the scattering may not be sufficiently smooth, such that a luminance uniformity enabled by the scattering may be insufficient. If the thickness of the insulating layer 400A is thicker than about 10 μm, the scattered light may be significantly blocked by some scatterers (A) and/or may be absorbed by the insulating layer 400A, such that luminance may deteriorate.

The scatterers (A) are dispersed and disposed in the resin composition of the insulating layer 400A to scatter light that has passed through the first polarizer 280 and the second polarizer 290.

The scatterers (A) scatter the light that has passed through the first polarizer 280 and the second polarizer 290, thereby improving luminance uniformity of the second light (which has wavelengths according to the color filter layers 410, 420, and 430). In an embodiment, since luminance uniformity of light of primary colors (e.g., including red, green, and blue colors) may be improved, the second light may have Lambertian light distribution with substantially uniform brightness regardless of an angle of a user's line-of-sight relative to the display area of the display device.

The scatterers (A) may include particles made of different materials having two or more refractive indexes, for improving the scattering. For example, titanium oxide ($TiO_2$) with a refractive index of about 2.66 may be used, inorganic particles such as silica ($SiO_2$) or zirconium oxide ($ZrO_2$) or a macromolecular material such as polystyrene (PS) or polymethylmethacrylate (PMMA) may be used, and/or various other materials may be used for making particles of the scatterers (A).

Furthermore, for improving scattering, a scatterer (A) may have a hollow structure.

The color filter layers 410, 420, and 430 are positioned at an upper surface of the insulating layer 400A. The first light passing through the display panel 200 may be incident on the color filter layers 410, 420, and 430 and then may be converted into the second light with one or more other wavelengths to be emitted. The color filter layers 410, 420, and 430 may include a red color filter 410, a green color filter 420, and a blue color filter 430 for emitting red light, green light, and blue light. Accordingly, the second light output from the color filter layers 410, 420, and 430 may have the wavelengths of the red light, the green light, and the blue light.

A light-blocking matrix 440 (e.g., a black matrix) includes portions positioned between the red color filter 410, the green color filter 420, and the blue color filter 430 to prevent interference of light converted by each color filter.

The window 500 is positioned on the color filter layers 410, 420, and 430, and may be made of transparent glass or synthetic resins for protecting the color filter layers 410, 420, and 430.

Figure 3:
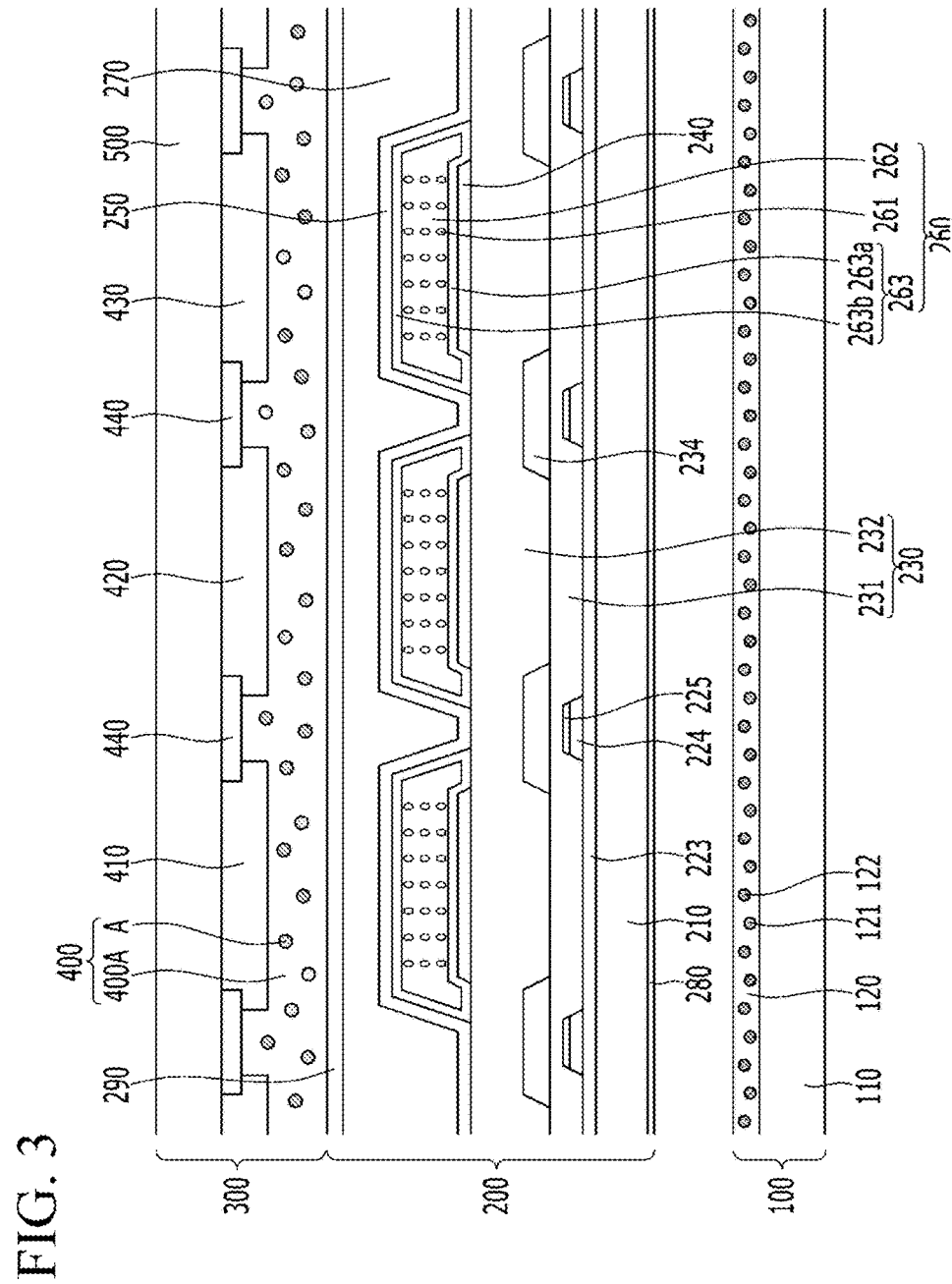
FIG. 3 illustrates a cross-sectional view of an embodiment taken along line II-II of FIG. 1.

FIG. 3 illustrates a cross-sectional view of an embodiment taken along line II-II of FIG. 1. As shown in FIG. 3, in the display device, the second polarizer 290 may be a polarization film, and may be attached on the display panel 200.

Some features of the display device may be identical to or analogous to those described with reference to FIG. 2.

Figure 4:
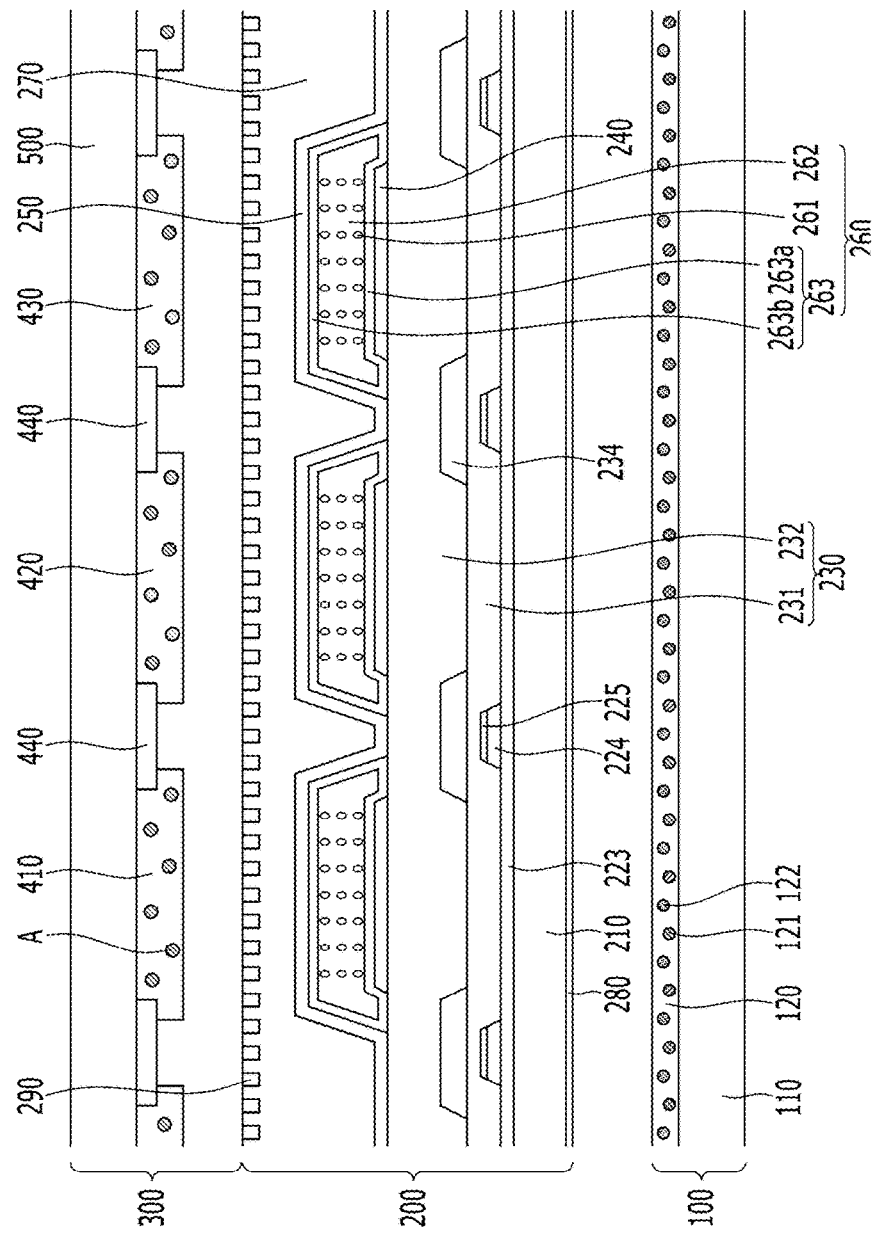
FIG. 4 illustrates a cross-sectional view of an embodiment taken along line II-II of FIG. 1.

FIG. 4 illustrates a cross-sectional view of a display device according to an embodiment. FIG. 4 illustrates a cross-sectional view of an embodiment taken along line II-II of FIG. 1. Referring to FIG. 4, the scatterers (A) are included inside color filter layers 410, 420, and 430. The scatterers (A) may be scattered and disposed in the resin compositions the color filter layers 410, 420, and 430. Thus, the display device may not include a separate scattering layer 400 (illustrated in FIG. 2 or FIG. 3), and the color filter layers 410, 420, and 430 may perform the function of the scattering layer 400.

One or more of color filter layers 410, 420, and 430 may be made of a resin composition including an organic material, an inorganic material, or an organic and inorganic composite. In an embodiment, each of the color filter layers 410, 420, and 430 may be a transparent organic layer including an acryl-based resin, an inorganic layer including $SiO_x$ or $SiN_x$, or a layer including an organic and inorganic compound such as polysilsesquioxane.

In an embodiment, each of the color filter layers 410, 420, and 430 may be a transparent organic layer including a photocurable polymer or a thermosetting polymer.

Each of the color filter layers 410, 420, and 430, including scatterers (A), may have a thickness (e.g., a minimum thickness in a direction perpendicular to the window 500) in a range of about 1 μm to about 10 μm. Similar to the insulating layer 400A, if the thickness of each of the color filter layers 410, 420, and 430 is thinner than about 1 μm, luminance uniformity enabled by the scattering may be insufficient; if the thickness of each of the color filter layers 410, 420, and 430 is thicker than about 10 μm, the scattered light may be blocked by some scatterers (A) and/or may be absorbed by the color filter layers 410, 420, and 430, and luminance may deteriorate.

The second polarizer 290 shown in FIG. 4 may be a wire grid polarizer.

Figure 5:
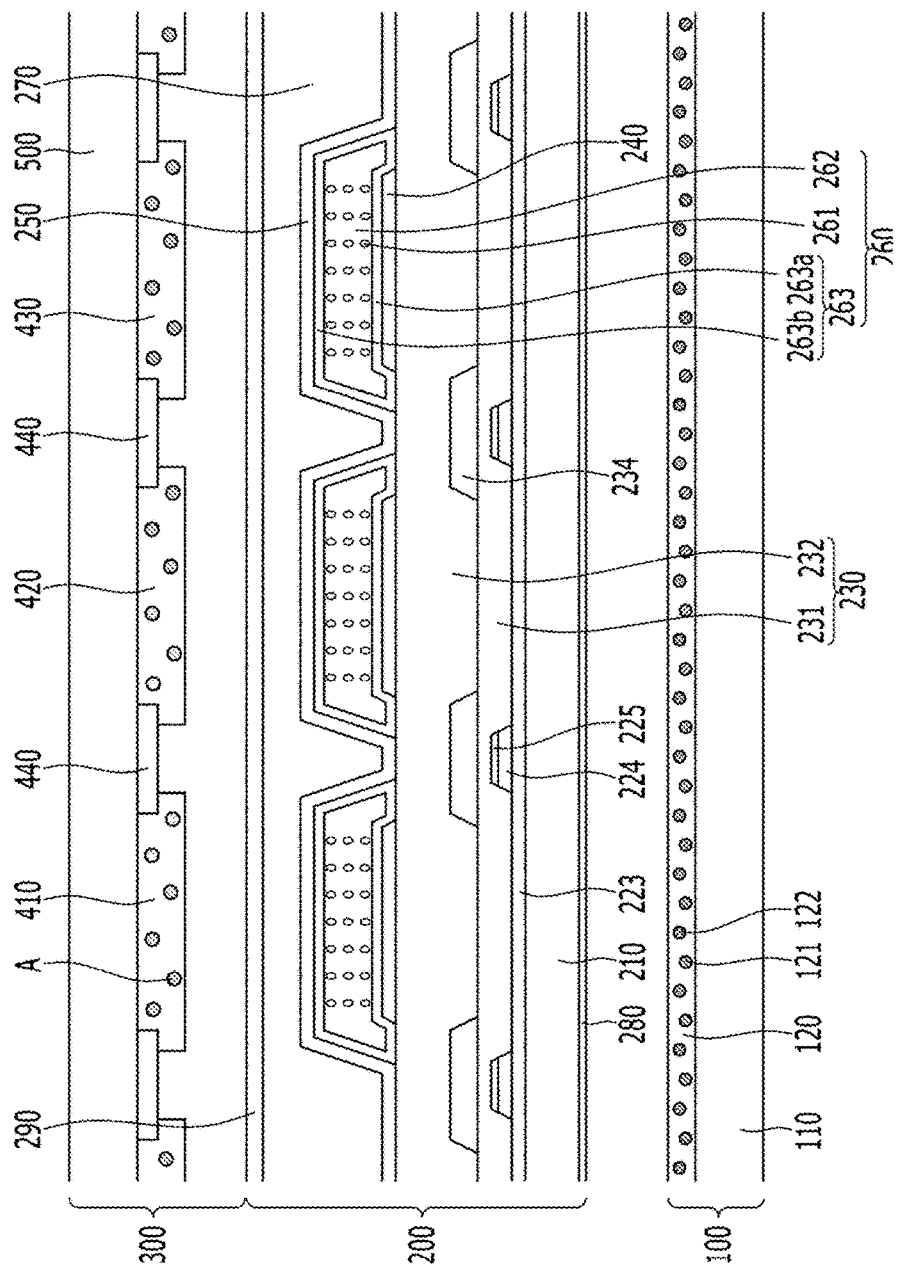
FIG. 5 illustrates a cross-sectional view of an embodiment taken along line II-II of FIG. 1.

FIG. 5 illustrates a cross-sectional view of a display device according to an embodiment. The display device shown in FIG. 5 includes color filter layers 410, 420, and 430 including scatterers (A) similar to elements shown in FIG. 4, and the second polarizer 290 shown in FIG. 5 includes a polarization film similar to one or more elements shown in FIG. 3.

Figure 6:
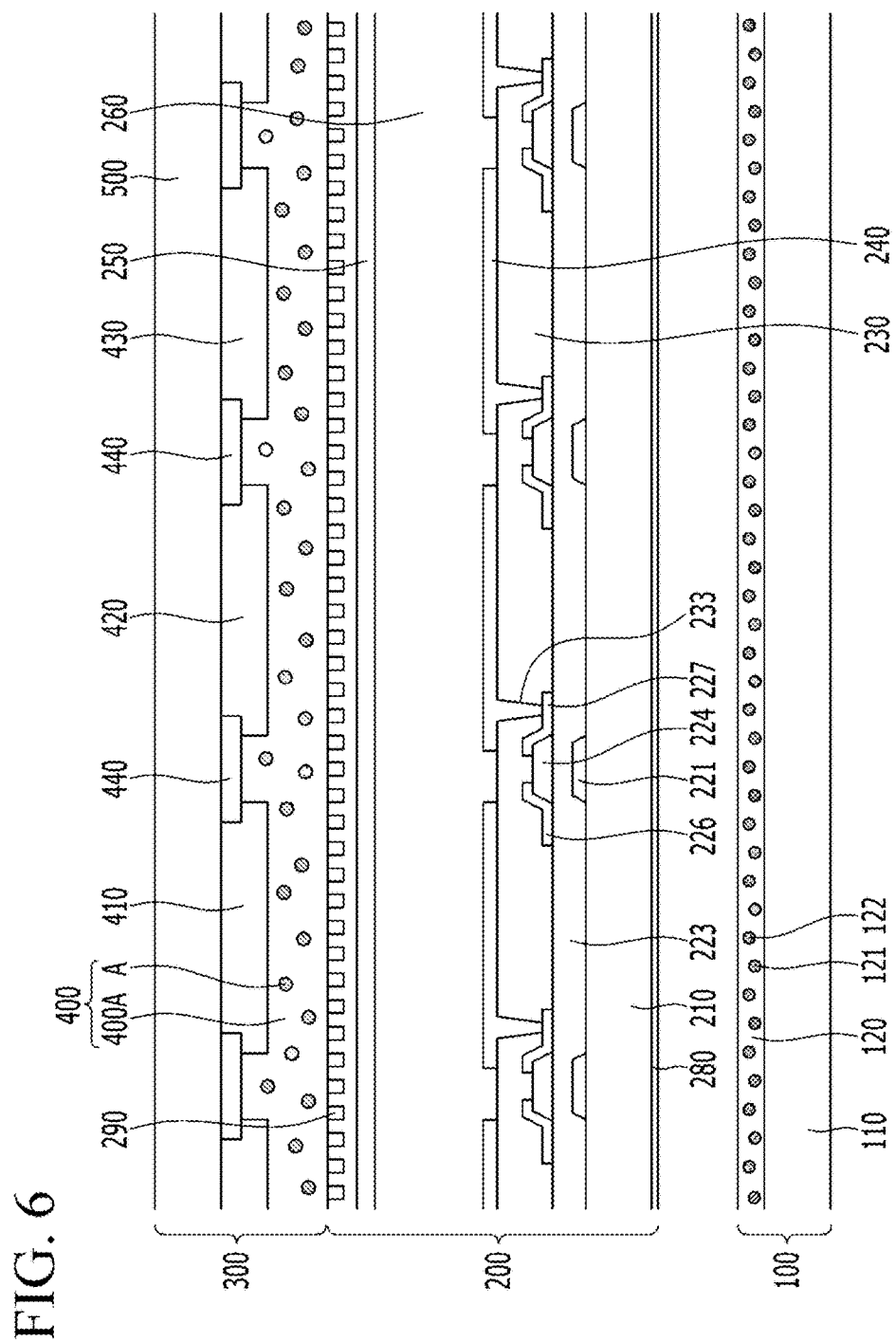
FIG. 6 illustrates a cross-sectional view of an embodiment taken along line II-II of FIG. 1.
Figure 7:
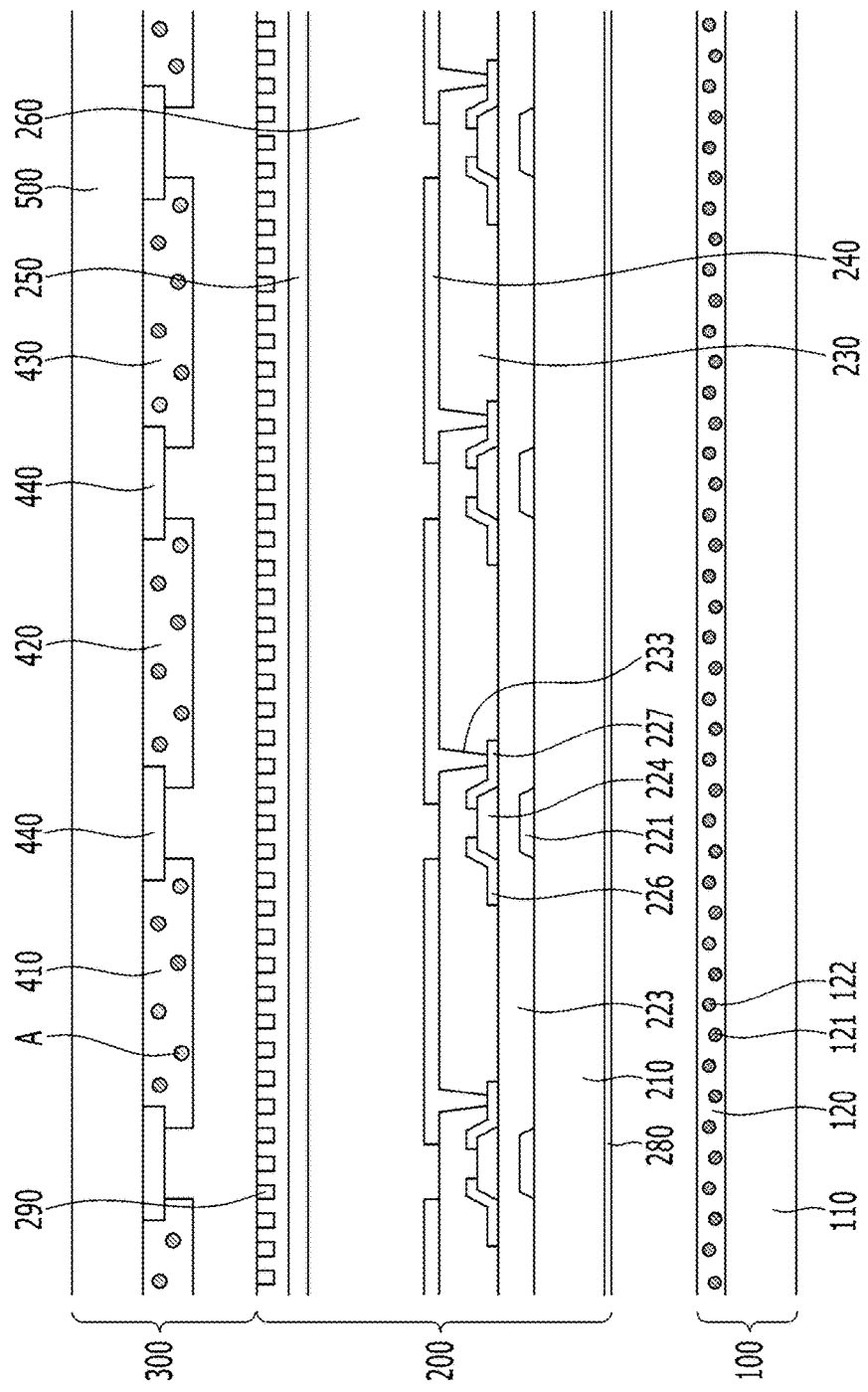
FIG. 7 illustrates a cross-sectional view of an embodiment taken along line II-II of FIG. 1.

FIG. 6 and FIG. 7 illustrate variations of display panel structures in view of the display panel 200 of the display devices illustrated in FIG. 2 to FIG. 5. The display panel 200 shown in FIG. 6 and FIG. 7, unlike the display panel 200 shown in FIG. 2 to FIG. 5, does not include the microcavities 262 and the roof layer 270. Each of the display panel 200 shown in FIG. 6 and the display panel 200 shown in FIG. 7 has a liquid crystal layer 260 positioned between a first electrode 240 and a second electrode 250.

Similar to the above-described embodiments, in the embodiments shown in FIG. 6 and FIG. 7, the second polarizer 290 may be positioned between the second electrode 250 and the scatterers (A) so that the light passing through the second electrode 250 and the second polarizer 290 may be scattered by the scatterers (A). In an embodiment, the second polarizer 290 may be a wire grid polarizer formed in an in-cell way. In an embodiment, and a polarization film may be implemented as the second polarizer 290.

As shown in FIG. 6, scatterers (A) may be formed on the second polarizer 290 so that the light passing through the second polarizer 290 may be scattered. As shown in FIG. 7, scatterers (A) may be formed inside the color filter layers 410, 420, and 430.

Some components shown in FIG. 4 to FIG. 7 may be substantially identical to or analogous to some components described above with reference to FIG. 2 and FIG. 3.

Figure 8:
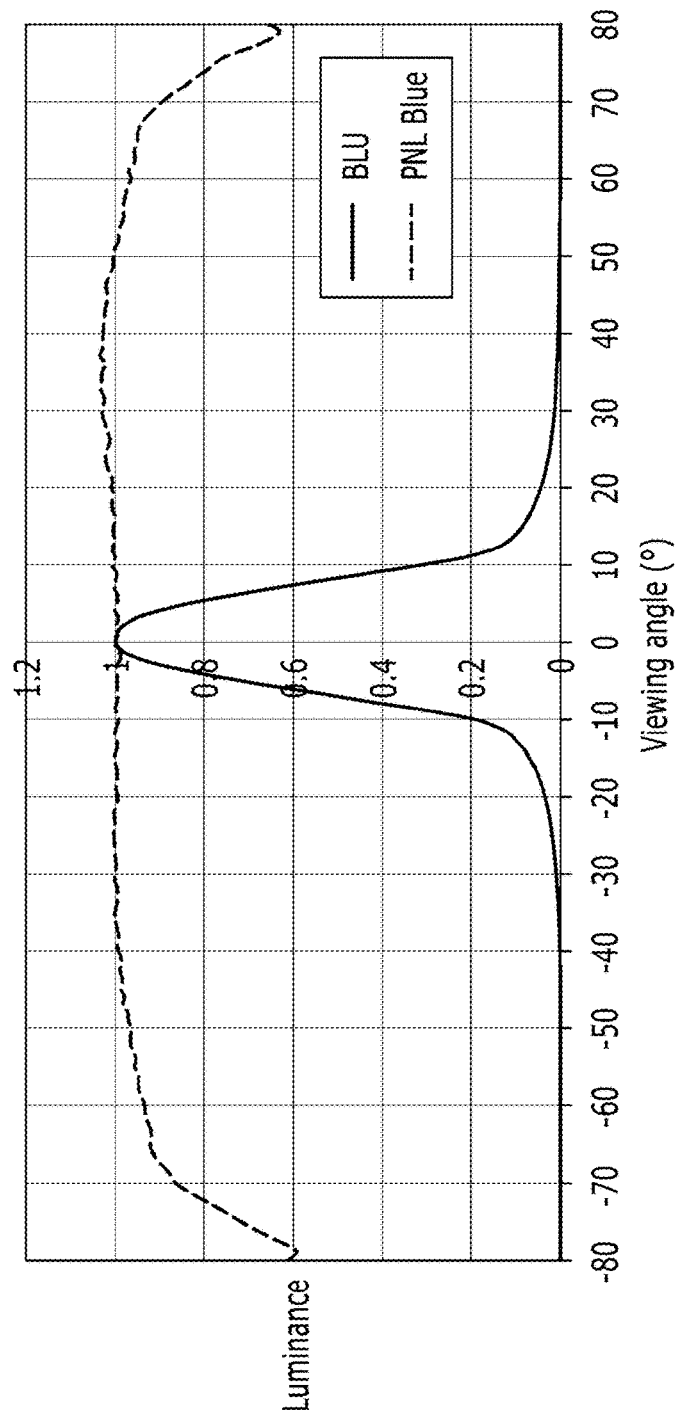
FIG. 8 illustrates a graph of intensity of light provided by a display device at various angles according to an embodiment.

FIG. 8 illustrates a normalized graph of intensity of light provided by a display device at various angles according to an embodiment. Since FIG. 8 illustrates the normalized graph, a highest point value designates 1, and the remaining values designate relative ones with respect to the highest point value.

Referring to FIG. 8, light intensities of red, green, and blue measured at most of a side of the display device is 90% or more compared to those of red, green, and blue measured at a center of the display device. In other words, substantially the same luminance is obtained in a wide range of angles of a user's line-of-sight relative to the display device. In addition, the light intensity change at about 70 degrees of at the side based is in a range of about 10% relative to the light intensity at the center of the display device. Accordingly, a viewing angle of the display device may be optimized.

Figure 9:
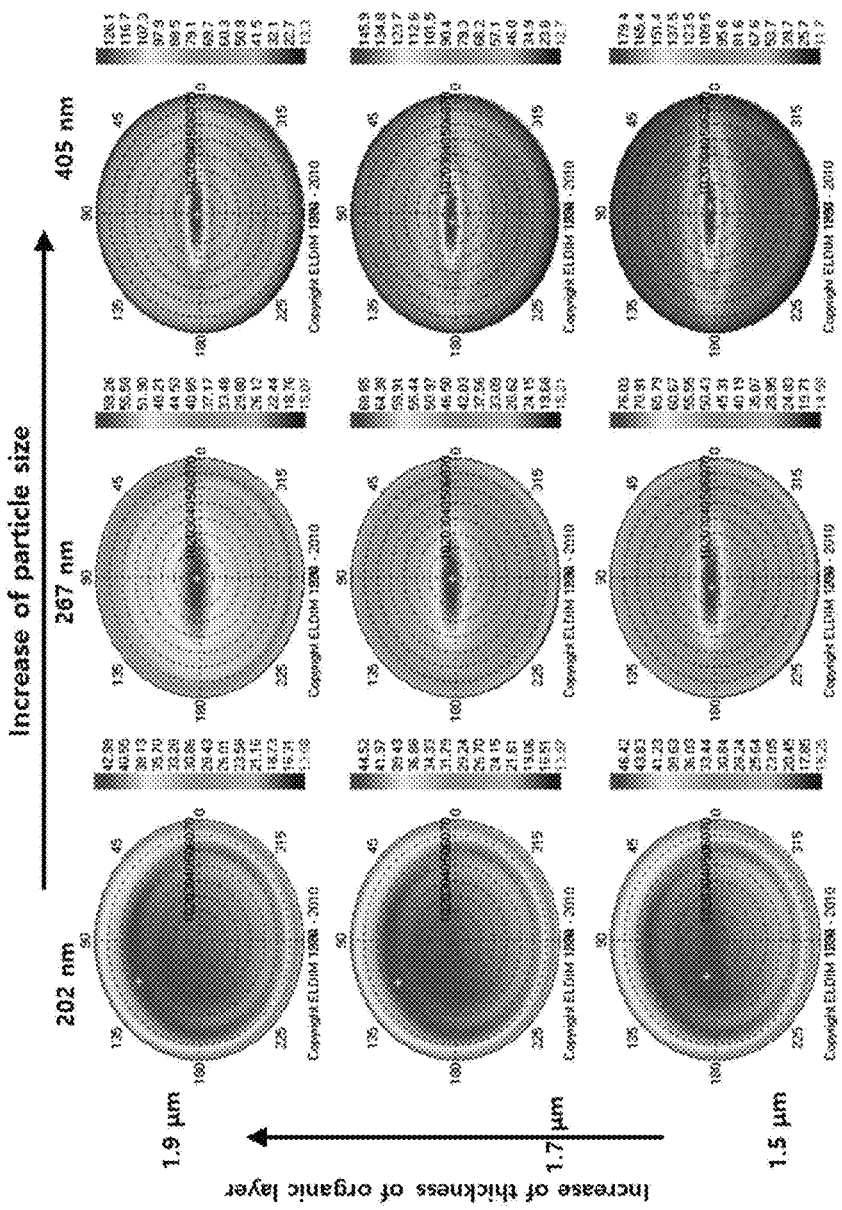
FIG. 9 illustrates graphs of light intensity distribution for various angles according to thickness values of a scattering layer and particle sizes of scatterers in a display device according to an embodiment.

FIG. 9 illustrates graphs of luminance distribution for various angles in relation to thickness values of an organic layer, in which a scatterer weight concentration (PWC) is about 30 wt %, and in relation to sizes of the scatterers (A) in a display device according to an embodiment. In an embodiment, the scatterers (A) are made of $TiO_2$, and a refractive index of the scatters (A) is about 2.66.

A central portion of the graph of FIG. 9 represents luminance observed at a central portion of the display device, and respective circular graphs correspond to luminance observed at various angles. Each of the graphs of FIG. 9 represents luminance values measured in 360 degrees and a 3-dimensional region.

As colors of the graphs of FIG. 9 are closer to red, luminance values of the colors increase; as colors are closer to blue, luminance values of the colors decrease. Accordingly, in the graphs shown in FIG. 9, as the colors of more of the circles are closer to red (as the overall red area is large), ideal Lambertian light distribution is obtained; as the colors are closer to blue (as the overall red area is small), light distribution may have relatively high concentration at the center of the circle.

Each of most of the scatterers A may preferably have a diameter in a range of about 0.1 times the wavelength of the first light, which is scattered by the scatterers (A), to about 0.5 times the wavelength of the first light. If the diameter of the scatterer A is smaller than about 0.1 times the wavelength of the first light, light may not be sufficiently scattered; if the diameter of the scatterer A exceeds about 0.5 times the wavelength of the first light scattered by the scatterer A, light may be substantially reflected by scatterers A and/or may be absorbed in a layer that includes the scatterers A, such that luminance may decrease.

The first light that is generated by the backlight unit 100 and passes through the display panel 200 may be white light result from combination of red light, green light, and blue light. In an embodiment, a wavelength of the red light is about 700 nm and is longer than that of the blue light of about 450 nm. Accordingly, as shown in FIG. 9, when the diameter of the scatterer (A) is about 405 nm, since the diameter is close to the wavelength of blue light having a shortest wavelength, scattering may not be smoothly and/or sufficiently performed. In other words, since luminance of the scattered light does not form a uniform distribution at different angles and is concentrated at the central portion of the display device, the overall graphic colors are mostly blue.

In contrast, when the diameter of the scatterer (A) is about 202 nm, since the diameter is smaller than about ½ of the wavelength of blue light having the shortest wavelength, and since the diameter is significantly less than 350 nm (about ½ of the wavelength of red light having a longest wavelength), scattering may be smoothly and/or sufficiently performed. As shown in FIG. 9, when the diameter of the scatterer A is equal to or less than about ½ of the shortest wavelength, since uniform luminance is obtained for various angles relative to the display device, the graphic colors are mostly red.

In addition, referring to FIG. 9, if the thickness of the organic layer including the scatterers A is thicker than about 1.5 µm and is close to about 1.9 µm, substantially uniform luminance is obtained.

Figure 10:
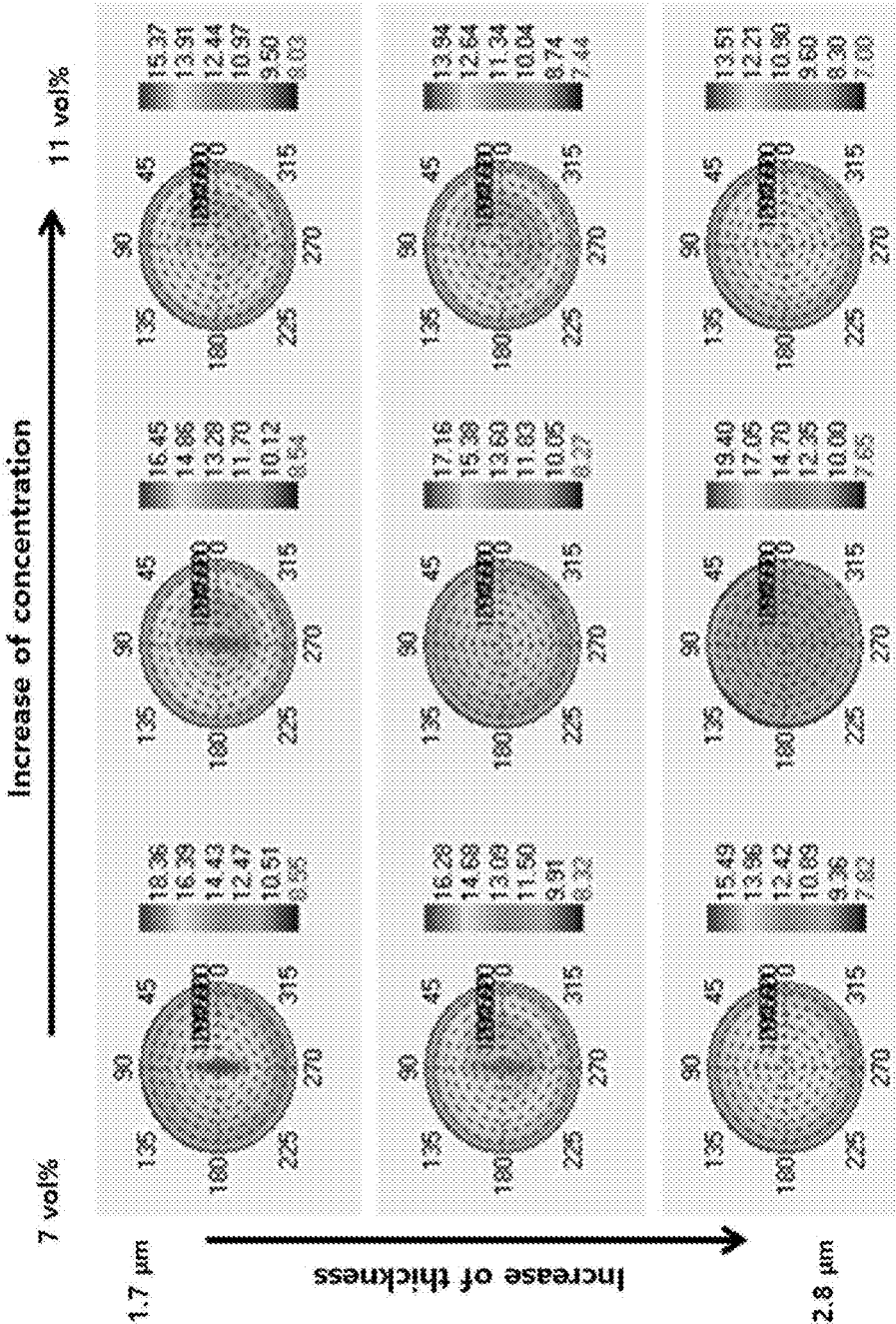
FIG. 10 illustrates graphs of light intensity distribution for various angles according to thickness values of a scattering layer and concentration values of scatterers in a display device according to an embodiment.

FIG. 10 illustrates graphs of light intensity distribution for various angles according to thickness values of an organic layer including the scatterers A and concentration values of the scatterers A in a display device according to an embodiment.

FIG. 10 illustrates graphs of luminance distributions related to organic layer thickness values of about 1.7 µm, about 2.1 µm, and about 2.8 µm and related to scatterer (or particle) weight concentrations (PWC) (in nonvolatile states) of about 7 wt %, 9 wt %, and 11 wt %. The scatterers A may be made of $TiO_2$ (of which refractive index is about 2.66) and may each have a diameter of about 200 nm.

As shown in FIG. 10, as the thickness of the organic layer increases from about 1.7 µm to about 2.8 µm, luminance distribution with respect to angles may become more uniform.

The scattering effect is also affected by concentration of the scatterers (A) dispersed in a resin composition. As shown in FIG. 10, when the concentration of the scatterers A increases, the luminance distribution becomes more uniform.

Figure 11:
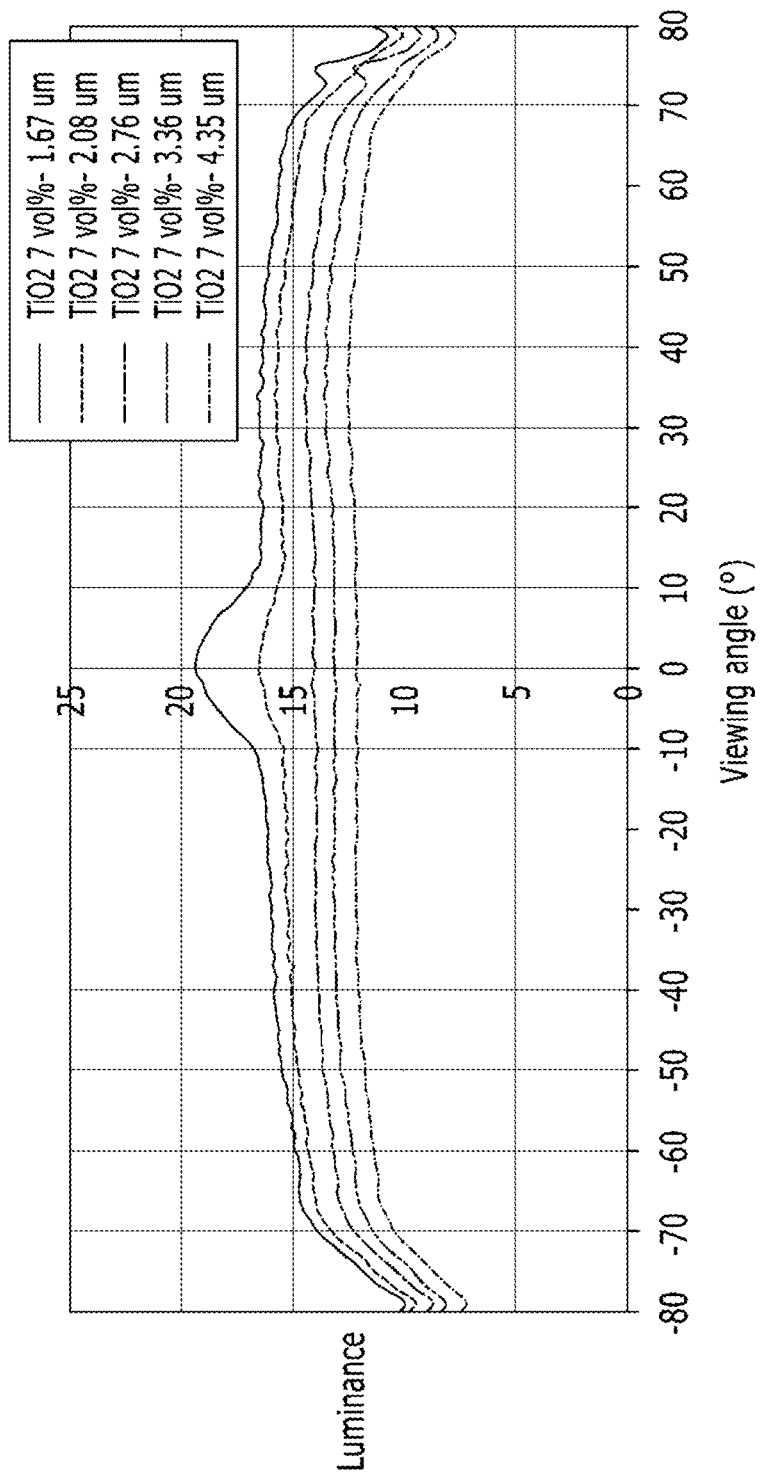
FIG. 11 illustrates a graph of luminance values measured for various viewing angles based on thickness values of a scattering layer of a display device according to an embodiment.

FIG. 11 illustrates a 2-dimensional graph of luminance values measured for various viewing angles based on thickness values of a scattering layer 400 of a display device according to an embodiment. Referring to FIG. 11, as the thickness of the scattering layer 400 increases, although overall luminance decreases, luminance distribution becomes more uniform.

Figure 12:
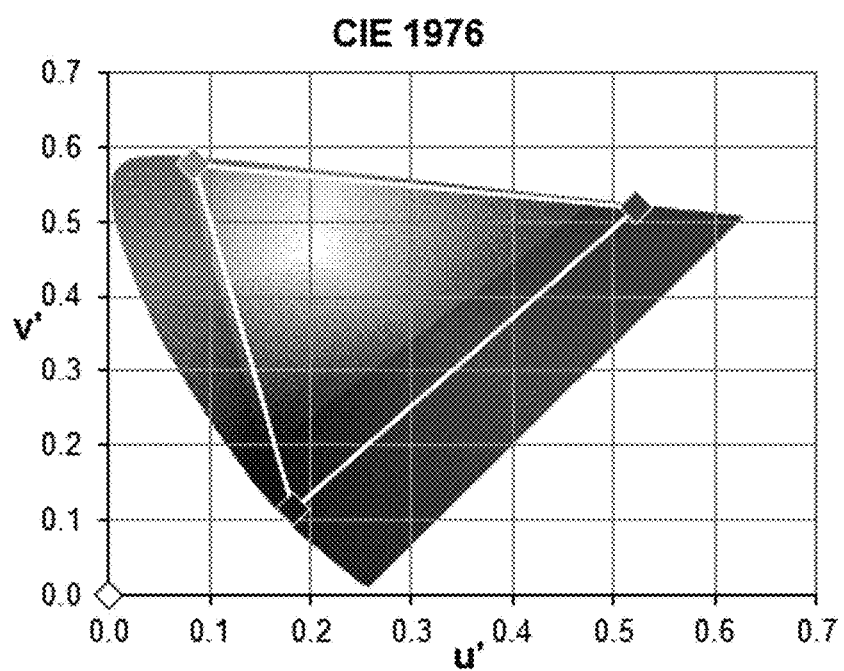
FIG. 12 illustrates a graph of a result of simulating a color reproduction ratio of a display device according to an embodiment.

FIG. 12 illustrates a graph of a result of simulating a color reproduction ratio of a display device according to an embodiment. Since the second light emitted from the display device forms a distribution having a wavelength of pure red, green, and blue light, a satisfactorily accurate color reproduction ratio may be obtained by the display device.

According to embodiments, the light passing through the first polarizer 280 and the second polarizer 290 is scattered by the scatterers A to have a substantially uniform luminance distribution. According embodiments, a satisfactory color reproduction ratio of a display device may be attained. Advantageously, a display device may display images with satisfactory quality to viewers having lines-of-sight oriented at various angles relative to the display area of the display device.

While example embodiments have been described, practical embodiments are not limited to the described embodiments. Embodiments are intended to cover various modifications and equivalent arrangements within the spirit and scope defined by the appended claims.

What is claimed is:

1. A display device comprising:
   a first polarizer;
   a second polarizer overlapping the first polarizer;
   a liquid crystal layer positioned between the first polarizer and the second polarizer;
   a light unit overlapping the liquid crystal layer and configured to provide first light, wherein the first polarizer is positioned between the light unit and the liquid crystal layer;
   a color filter layer overlapping the liquid crystal layer, wherein the second polarizer is positioned between the color filter layer and the liquid crystal layer; and
   a particle set comprising a plurality of particles, overlapping the liquid crystal layer, and configured to scatter the first light, wherein the second polarizer is positioned between the particle set and the liquid crystal layer.

2. The display device of claim 1, wherein the particle set is positioned between the color filter layer and the second polarizer.

3. The display device of claim 1 comprising: an insulating resin layer positioned between the color filter layer and the second polarizer, wherein the particles are dispersed inside the insulating resin layer.

4. The display device of claim 1, wherein a diameter of each of the particles is in a range of 0.1 times a wavelength of the first light to 0.5 times the wavelength of the first light.

5. The display device of claim 1, wherein the particle set has two or more refractive indexes.

6. The display device of claim 1 comprising: a resin layer, wherein the particles are dispersed inside the resin layer, and wherein the second polarizer directly contacts the resin layer.

7. The display device of claim 1, wherein the light unit comprises:
   a light source for emitting blue light, and
   a color conversion sheet overlapping the light source and comprising a red color conversion quantum dot and a green color conversion quantum dot.

8. The display device of claim 1 comprising: an insulating layer, wherein the particles are dispersed inside the insulating layer, and wherein a thickness of the insulating layer is in a range of 1 µm to 10 µm.

9. The display device of claim 1, wherein the particles are dispersed inside the color filter layer.

10. The display device of claim 9, wherein a thickness of the color filter layer is in a range of 1 µm to 10 µm.

11. The display device of claim 1 comprising: an insulating layer directly contacting each of the color filter layer and the second polarizer, wherein the particles are dispersed inside the insulating layer.

12. The display device of claim 11, wherein a first portion of the insulating layer is positioned between the particle set and the second polarizer.

13. The display device of claim 12, wherein a second portion of the insulating layer is positioned between the particle set and the color filter layer.

14. The display device of claim 1,
wherein the color filter layer comprises a first-color filter and a second-color filter, and
wherein at least one particle of the particles is positioned inside a recess structure that is positioned between the first-color filter and the second-color filter.

15. The display device of claim 1 comprising:
a light-blocking member comprising a first light-blocking portion,
wherein the color filter layer comprises a first-color filter and a second-color filter,
wherein the first light-blocking portion is positioned between the first-color filter and the second-color filter and forms a recess structure with the first-color filter and the second-color filter, and
wherein at least one particle of the particles is positioned inside the recess structure.

16. The display device of claim 1 comprising:
a transparent layer; and
a light-blocking member directly contacting the transparent layer and comprising a first light-blocking portion and a second light-blocking portion,
wherein the color filter layer comprises a first-color filter, a second-color filter, and a third-color filter,
wherein the first light-blocking portion is positioned between the first-color filter and the second-color filter,
wherein the second light-blocking portion is positioned between the second-color filter and the third-color filter,
wherein the transparent layer forms a recess structure with the first light-blocking portion and the second light-blocking portion, and
wherein at least one particle of the particles is positioned inside the recess structure.

17. The display device of claim 16, wherein more than one of the particles are positioned inside the recess structure.

18. The display device of claim 1 comprising:
a transparent layer,
wherein the color filter layer comprises a first-color filter, and
wherein a portion of the first-color filter is positioned between the transparent layer and one particle of the particles and directly contacts each of the transparent layer and the one particle of the particles.

19. The display device of claim 1,
wherein the color filter layer comprises a first-color filter and a second-color filter,
wherein the particle set comprises a first particle subset and a second particle subset,
wherein a material of particles of the first particle subset is identical to a material of particles of the second particle subset,
wherein the particles of the first particle subset are dispersed inside the first-color filter, and
wherein the particles of the second particle subset are dispersed inside the second-color filter.

20. The display device of claim 1 comprising:
a light-blocking member comprising a light-blocking portion,
wherein the color filter layer comprises a first-color filter and a second-color filter, and
wherein the light-blocking portion is positioned between the first-color filter and the second-color filter, is positioned between two of the particles, and is aligned with the two of the particles.

* * * * *